(12) United States Patent
Wu

(10) Patent No.: US 10,327,279 B2
(45) Date of Patent: Jun. 18, 2019

(54) DEVICE AND METHOD OF HANDLING DATA TRANSMISSIONS AFTER DETECTING A FAILURE IN A WIRELESS COMMUNICATION SYSTEM

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/826,727

(22) Filed: Nov. 30, 2017

(65) Prior Publication Data

US 2018/0160458 A1  Jun. 7, 2018

Related U.S. Application Data

(60) Provisional application No. 62/429,085, filed on Dec. 2, 2016.

(51) Int. Cl.
*H04W 76/19* (2018.01)
*H04W 84/04* (2009.01)

(52) U.S. Cl.
CPC .......... *H04W 76/19* (2018.02); *H04W 84/045* (2013.01)

(58) Field of Classification Search
CPC .................................................... H04W 76/19
See application file for complete search history.

(56) References Cited

U.S. PATENT DOCUMENTS

| 2009/0252132 A1* | 10/2009 | Song | H04W 4/00 |
| 2010/0322067 A1* | 12/2010 | Tenny | H04W 72/04 |
| 2015/0304904 A1* | 10/2015 | Li | H04W 36/00 |
| 2016/0212753 A1 | 7/2016 | Wu | |
| 2016/0353511 A1 | 12/2016 | Gunnarsson | |

FOREIGN PATENT DOCUMENTS

| JP | 2016-530811 A | 9/2016 |
| WO | 2015/140038 A1 | 9/2015 |

OTHER PUBLICATIONS

3GPP TR 23.799 V1.1.0, Oct. 2016.
Search Report dated Feb. 22, 2018 for EP application No. 17204856.3, pp. 1-4.
Office Action dated Dec. 25, 2018 for the Japanese Application No. 2017-231689, filed Dec. 1, 2017, pp. 1-5.

* cited by examiner

*Primary Examiner* — Ronald B Abelson
(74) *Attorney, Agent, or Firm* — Winston Hsu

(57) ABSTRACT

A communication device for handling data transmissions after detecting a failure comprises a storage device for storing instructions and a processing circuit coupled to the storage device. The processing circuit is configured to execute the instructions stored. The instructions comprise receiving a first radio resource control (RRC) message configuring a first data radio bearer (DRB) and configuring a mapping that a first flow is mapped to the first DRB, from a first BS; transmitting a first plurality of protocol data units (PDUs) of the first flow; receiving a PDU of the first flow or a second flow over a second DRB; transmitting a second plurality of PDUs of the first flow; detecting a failure; transmitting a failure recovery request message to the first BS or a second BS; receiving a failure recovery message; and transmitting a third plurality of PDUs of the first flow over the first DRB.

17 Claims, 14 Drawing Sheets

DEVICE AND METHOD OF HANDLING DATA TRANSMISSIONS AFTER DETECTING A FAILURE IN A WIRELESS COMMUNICATION SYSTEM

CROSS REFERENCE TO RELATED APPLICATIONS

This application claims the benefit of U.S. Provisional Application No. 62/429,085, filed on Dec. 2, 2016, which is incorporated herein by reference.

BACKGROUND OF THE INVENTION

1. Field of the Invention

The present invention relates to a device and a method used in a wireless communication system, and more particularly, to a device and a method of handling data transmissions after detecting a failure in a wireless communication system.

2. Description of the Prior Art

A long-term evolution (LTE) system includes a carrier aggregation (CA), a Dual Connectivity (DC), a LTE transmission over an unlicensed spectrum (e.g., LTE-unlicensed (LTE-U) or licensed-assisted access (LAA)). In one example, a licensed spectrum may be needed for a LTE-U/LAA operation to assist a transmission in the unlicensed spectrum, e.g., carrier aggregation of the licensed spectrum and the unlicensed spectrum. In another example, the licensed spectrum may not be needed for the LTE-U operation, e.g., a user equipment (UE) communicates with an evolved Node-B (eNB) in the unlicensed spectrum but not in the licensed spectrum, which is called MulteFire.

SUMMARY OF THE INVENTION

The present invention therefore provides a communication device and method for handling data transmissions after detecting a failure in a wireless communication system to solve the abovementioned problem.

A communication device for handling data transmissions after detecting a failure comprises a storage device for storing instructions and a processing circuit coupled to the storage device. The processing circuit is configured to execute the instructions stored in the storage device. The instructions comprise receiving a first radio resource control (RRC) message configuring a first data radio bearer (DRB) and configuring a mapping that a first flow is mapped to the first DRB, from a first BS; transmitting a first plurality of protocol data units (PDUs) of the first flow over the first DRB to the first BS in response to the first RRC message; receiving a PDU of the first flow or a second flow over a second DRB from the first BS; transmitting a second plurality of PDUs of the first flow over the second DRB to the first BS in response to the PDU; detecting a failure, wherein the failure is a radio link failure, a handover failure, an integrity check failure or a RRC connection reconfiguration failure; transmitting a failure recovery request message to the first BS or a second BS in response to the failure; receiving a failure recovery message from the first BS or the second BS in response to the failure recovery request message; and transmitting a third plurality of PDUs of the first flow over the first DRB to the first BS or the second BS in response to the failure recovery message, after recovering the failure.

A communication device for handling data transmissions after detecting a failure comprises a storage device for storing instructions and a processing circuit coupled to the storage device. The processing circuit is configured to execute the instructions stored in the storage device. The instructions comprise receiving a first RRC message configuring a first DRB and configuring a mapping that a first flow is mapped to the first DRB, from a first BS; transmitting a first plurality of PDUs of the first flow over the first DRB to the first BS in response to the first RRC message; receiving a PDU of the first flow or a second flow over a second DRB from the first BS; transmitting a second plurality of PDUs of the first flow over the second DRB to the first BS in response to the PDU; detecting a failure, wherein the failure is a radio link failure, a handover failure, an integrity check failure or a RRC connection reconfiguration failure; transmitting a failure recovery request message to the first BS or a second BS in response to the failure; receiving a failure recovery message from the first BS or the second BS in response to the failure recovery request message; and transmitting a third plurality of PDUs of the first flow over the second DRB to the first BS or the second BS in response to the failure recovery message, after recovering the failure.

A communication device for handling data transmissions after detecting a failure comprises a storage device for storing instructions and a processing circuit coupled to the storage device. The processing circuit is configured to execute the instructions stored in the storage device. The instructions comprise receiving a first RRC message configuring a first DRB and configuring a mapping that a first flow is mapped to the first DRB, from a first BS; transmitting a first plurality of PDUs of the first flow over the first DRB to the first BS in response to the first RRC message; receiving a PDU of the first flow or a second flow over a second DRB from the first BS; transmitting a second plurality of PDUs of the first flow over the second DRB to the first BS in response to the PDU; detecting a failure, wherein the failure is a radio link failure, a handover failure, an integrity check failure or a RRC connection reconfiguration failure; transmitting a failure recovery request message to the first BS or a second BS in response to the failure; receiving a failure recovery message from the first BS or the second BS in response to the failure recovery request message; transmitting a failure recovery complete message to the first BS or the second BS in response to the failure recovery message; receiving a second RRC message from the first BS or the second BS, after transmitting the failure recovery complete message; and transmitting a third plurality of PDUs of the first flow over the second DRB to the first BS or the second BS in response to the second RRC message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
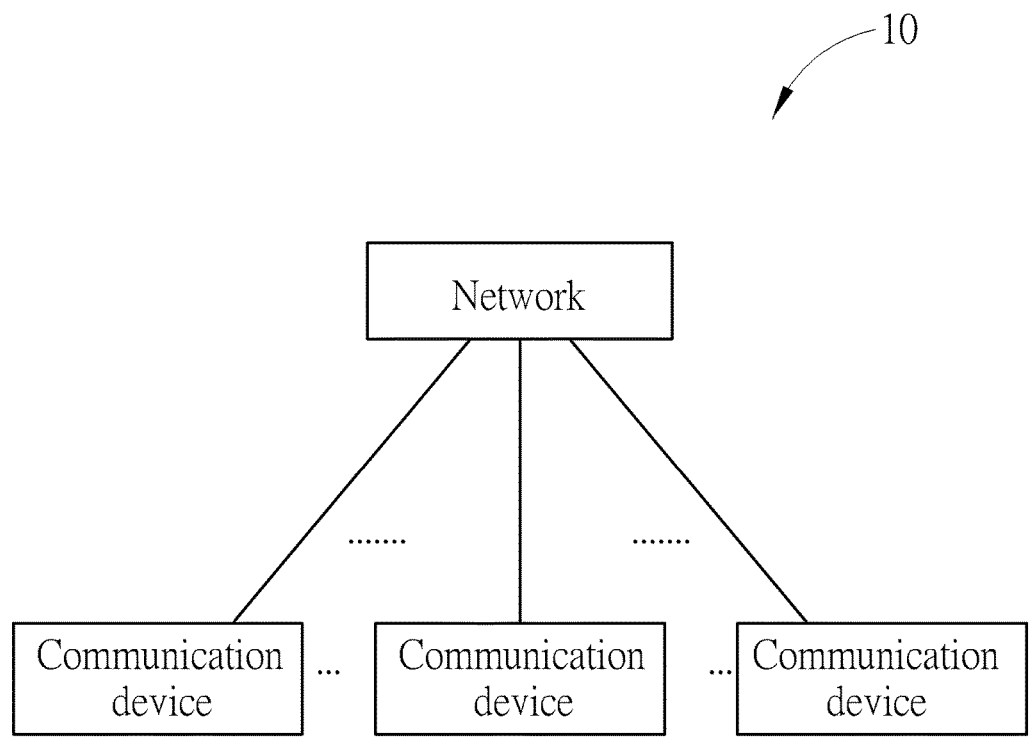
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may simultaneously communicate with each other via one or multiple cells (e.g., one or multiple carriers) belonging to one or multiple base station (BS). The abovementioned cells may be operated in the same or different duplexing modes, i.e., frequency-division duplexing (FDD), time-division duplexing (TDD) and flexible duplexing.

In FIG. 1, the network and the communication devices are simply utilized for illustrating the structure of the wireless communication system 10. Practically, the network may be an evolved universal terrestrial radio access network (E-UTRAN) including at least one evolved Node-B (eNB). The network may be a fifth generation (5G) network including at least one 5G BS which employs orthogonal frequency-division multiplexing (OFDM) and/or non-OFDM and a transmission time interval (TTI) shorter than 1 ms (e.g., 1, 2, 3 or 4 OFDM symbols and 100 or 200 microseconds), to communicate with the communication devices. In general, a BS may also be used to refer any of the eNB and the 5G BS.

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
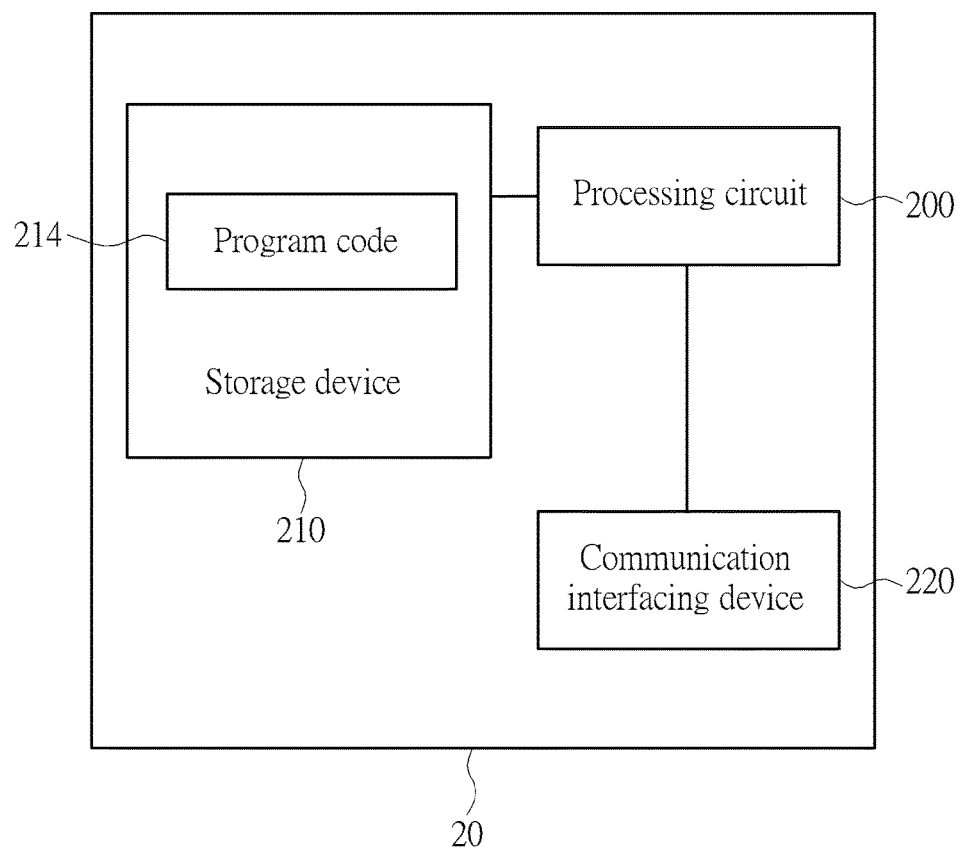
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The communication interfacing device 220 includes at least one transceiver and is used to transmit and receive signals (e.g., data, messages and/or packets) according to processing results of the processing circuit 200.

In the following examples, a UE is used for representing a communication device in FIG. 1, to simplify the illustration of the embodiments.

Figure 3:
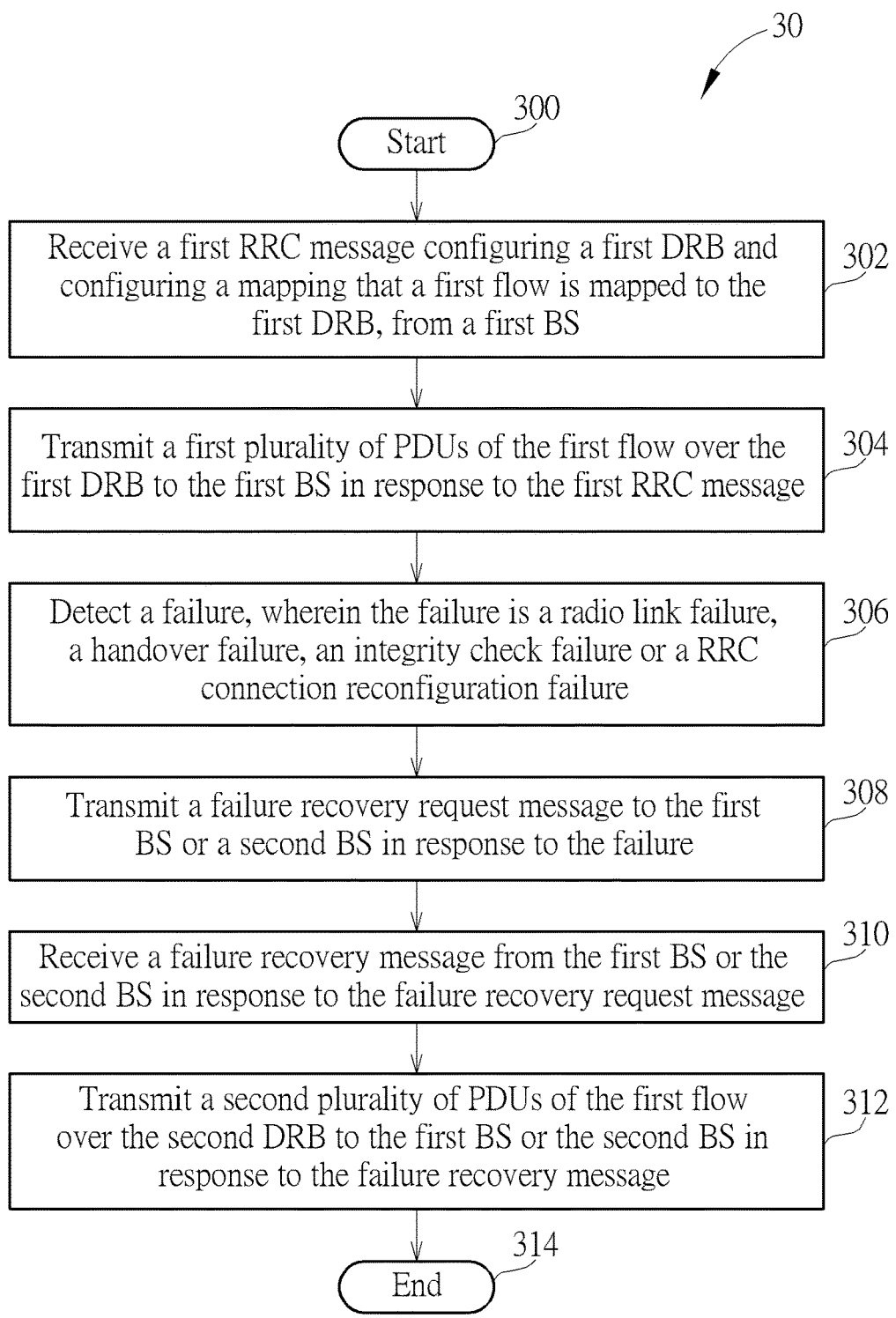
FIG. 3 is a flowchart of a process according to an example of the present invention.

FIG. 3 is a flowchart of a process 30 according to an example of the present invention. The process 30 is utilized in a UE, to handle data transmissions after detecting a failure. The process 30 includes the following steps:

Step 300: Start.

Step 302: Receive a first radio resource control (RRC) message configuring a first data radio bearer (DRB) and configuring a mapping that a first flow is mapped to the first DRB, from a first BS.

Step 304: Transmit a first plurality of protocol data units (PDUs) of the first flow over the first DRB to the first BS in response to the first RRC message.

Step 306: Detect a failure, wherein the failure is a radio link failure, a handover failure, an integrity check failure or a RRC connection reconfiguration failure.

Step 308: Transmit a failure recovery request message to the first BS or a second BS in response to the failure.

Step 310: Receive a failure recovery message from the first BS or the second BS in response to the failure recovery request message.

Step 312: Transmit a second plurality of PDUs of the first flow over a second DRB to the first BS or the second BS in response to the failure recovery message.

Step 314: End.

Realization of the process 30 is not limited to the above description. The following examples may be applied to the process 30.

In one example, the first RRC message includes a mapping configuration and a DRB configuration. The mapping configuration configures that the first flow is mapped to the first DRB. The DRB configuration configures the first DRB. The UE transmits the first plurality of PDUs of the first flow over the first DRB to the first BS in response to the mapping or the mapping configuration. In one example, the first DRB and the second DRB have different quality of services (QoSs). In one example, the first RRC message or a second RRC message transmitted by the first BS to the UE may configure the second DRB, before the failure occurs.

In one example, the UE releases at least one of a power control configuration and a periodic channel quality indicator (CQI) reporting configuration in response to the failure (or a failure recovery procedure).

In one example, the UE keeps the DRB configuration in response to the failure (or the failure recovery procedure). In one example, the UE releases the mapping configuration and keeps at least one configuration (e.g., a DRB identity, a radio link control (RLC) configuration, etc.) in the DRB configuration, if the mapping configuration is included in the DRB configuration. In one example, the UE releases the mapping configuration and keeps at least one configuration in a packet data convergence protocol (PDCP) configuration, if the mapping configuration is included in the PDCP configuration.

In one example, the UE is configured with an identifier (e.g., Radio Network Temporary Identifier (RNTI)) for monitoring a control channel transmitted by the first BS for scheduling at least one of UL transmission(s) and DL transmission(s), before detecting the failure. The UE may keep the identifier in response to the failure (or the failure recovery procedure).

In one example, the second DRB may be a default DRB. The UE transmits the second plurality of PDUs of the first flow over the second DRB in response to the failure recovery message, when the failure recovery message does not include the mapping configuration configuring that the first flow is mapped to the first DRB. That is, the UE releases the mapping configuration in response to the failure (or the failure recovery procedure).

In one example, the UE transmits the second plurality of PDUs of the first flow over the first DRB or a third DRB in response to the failure recovery message, when the failure recovery message includes a mapping configuration configuring that the first flow is mapped to the first DRB or the third DRB. In one example, the first DRB and the third DRB are not the default DRB. The first DRB, the second DRB and the third DRB may have different QoSs.

In one example, the failure recovery request message is used for requesting a reestablishment of a RRC connection, and the failure recovery message is used by the first BS or the second BS (e.g., a network) for reestablishing the RRC connection. In one example, the failure recovery message does or does not reconfigure at least one signalling radio bearer (SRB) of the RRC connection, the first DRB, the second DRB and/or the third DRB. The UE resumes the least one SRB, the first DRB, the second DRB and/or the third DRB, when receiving the failure recovery message. In one example, the failure recovery message does or does not reconfigure the third DRB, if the third DRB is configured before the UE detects the failure. Otherwise, the failure recovery message may configure the third DRB. In one example, the first DRB, the second DRB and the third DRB have different media access control (MAC) configurations, RLC configurations and/or PDCP configurations. In one example, after resuming the second DRB, the UE transmits the second plurality of PDUs over the second DRB.

Figure 4:
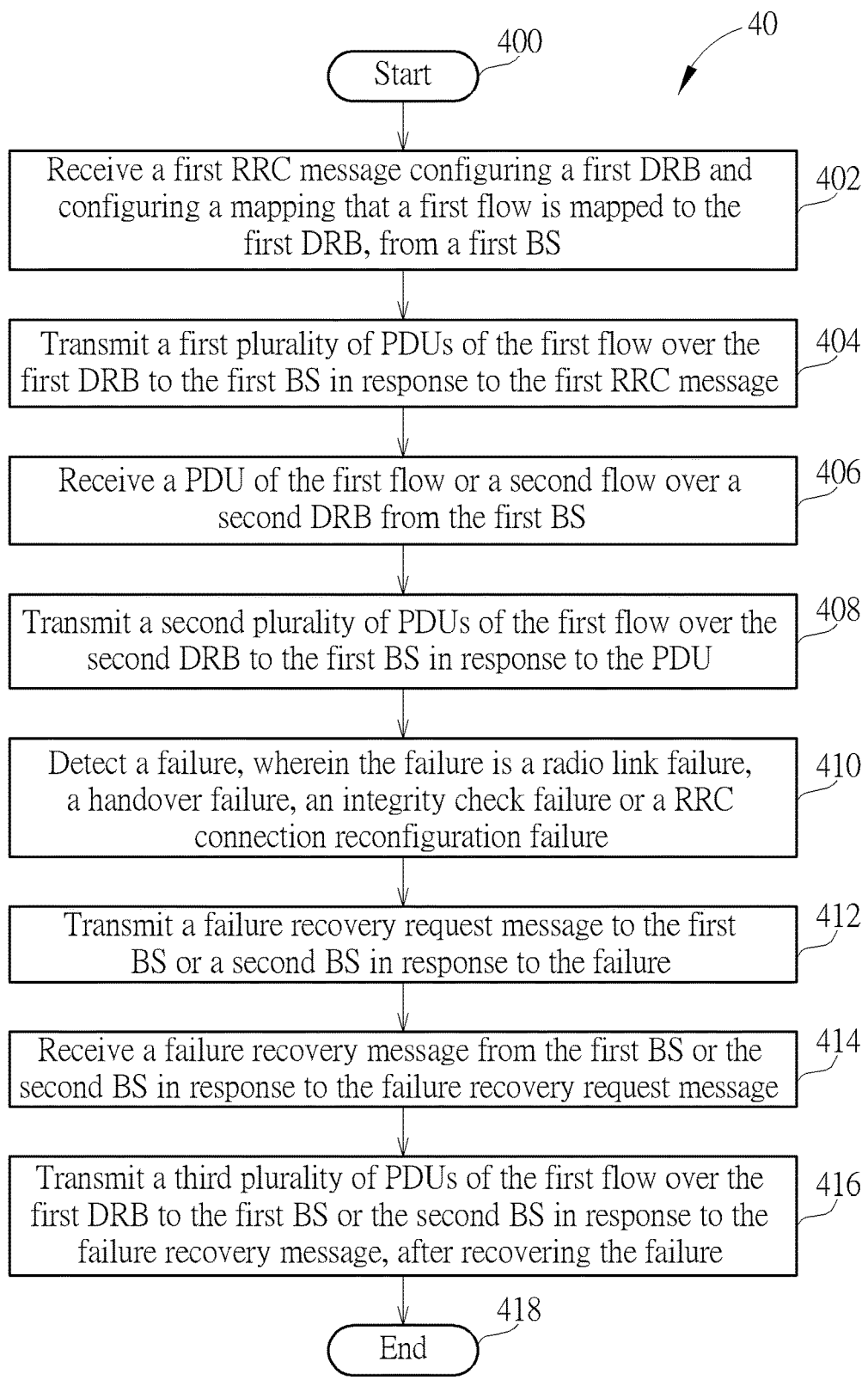
FIG. 4 is a flowchart of a process according to an example of the present invention.

FIG. 4 is a flowchart of a process 40 according to an example of the present invention. The process 40 is utilized in a UE, to handle data transmissions after detecting a failure. The process 40 includes the following steps:

Step 400: Start.

Step 402: Receive a first RRC message configuring a first DRB and configuring a mapping that a first flow is mapped to the first DRB, from a first BS.

Step 404: Transmit a first plurality of PDUs of the first flow over the first DRB to the first BS in response to the first RRC message.

Step 406: Receive a PDU of the first flow or a second flow over a second DRB from the first BS.

Step 408: Transmit a second plurality of PDUs of the first flow over the second DRB to the first BS in response to the PDU.

Step 410: Detect a failure, wherein the failure is a radio link failure, a handover failure, an integrity check failure or a RRC connection reconfiguration failure.

Step 412: Transmit a failure recovery request message to the first BS or a second BS in response to the failure.

Step 414: Receive a failure recovery message from the first BS or the second BS in response to the failure recovery request message.

Step 416: Transmit a third plurality of PDUs of the first flow over the first DRB to the first BS or the second BS in response to the failure recovery message, after recovering the failure.

Step 418: End.

Realization of the process 40 is not limited to the above description. The following examples may be applied to the process 40.

In one example, the first RRC message includes a mapping configuration and a DRB configuration. The mapping configuration configures that the first flow is mapped to the first DRB. The DRB configuration configures the first DRB.

In one example, the first BS transmits the PDU of the first flow or the second flow over the second DRB to the UE, to indicate the UE to transmit a fourth plurality of PDUs of the first flow and the second flow (if configured) over the second DRB. After the failure is detected, the indication may not be valid. Thus, the UE applies the mapping configuration (received in the first RRC message) to transmit the third plurality of PDUs on the first DRB. In one example, the first flow and the second flow are configured by the first BS to be aggregated on the first DRB in the first RRC message or a second RRC message.

In one example, the UE keeps the mapping configuration and the DRB configuration in response to the failure (or a failure recovery procedure). The mapping configuration may or may not be included in the DRB configuration. In one example, the UE releases a secondary cell (SCell) configuration or a secondary cell group (SCG) configuration in response to the failure (or the failure recovery procedure).

In one example, the UE transmits the third plurality of PDUs of the first flow over the first DRB in response to the failure recovery message, when the failure recovery message does not configure a mapping that the first flow is mapped to the second DRB (e.g., the failure recovery message does not configure mapping the first flow to the second DRB). That is, the UE does not change the mapping from the first flow to the first DRB, when the failure recovery message does not configure the mapping that the first flow is mapped to the second DRB. In addition, the failure recovery message may not configure the mapping that the first flow is mapped to the first DRB, and the UE knows that the first BS or the second BS (e.g., the network) would like the UE keeping the mapping that the first flow is mapped to the first DRB. In one example, the UE transmits the third plurality of PDUs of the first flow over the second DRB in response to the failure recovery message, when the failure recovery message configures the mapping that the first flow is mapped to the second DRB.

The examples of the process 30 may be applied to the process 40, and are not narrated herein.

Figure 5:
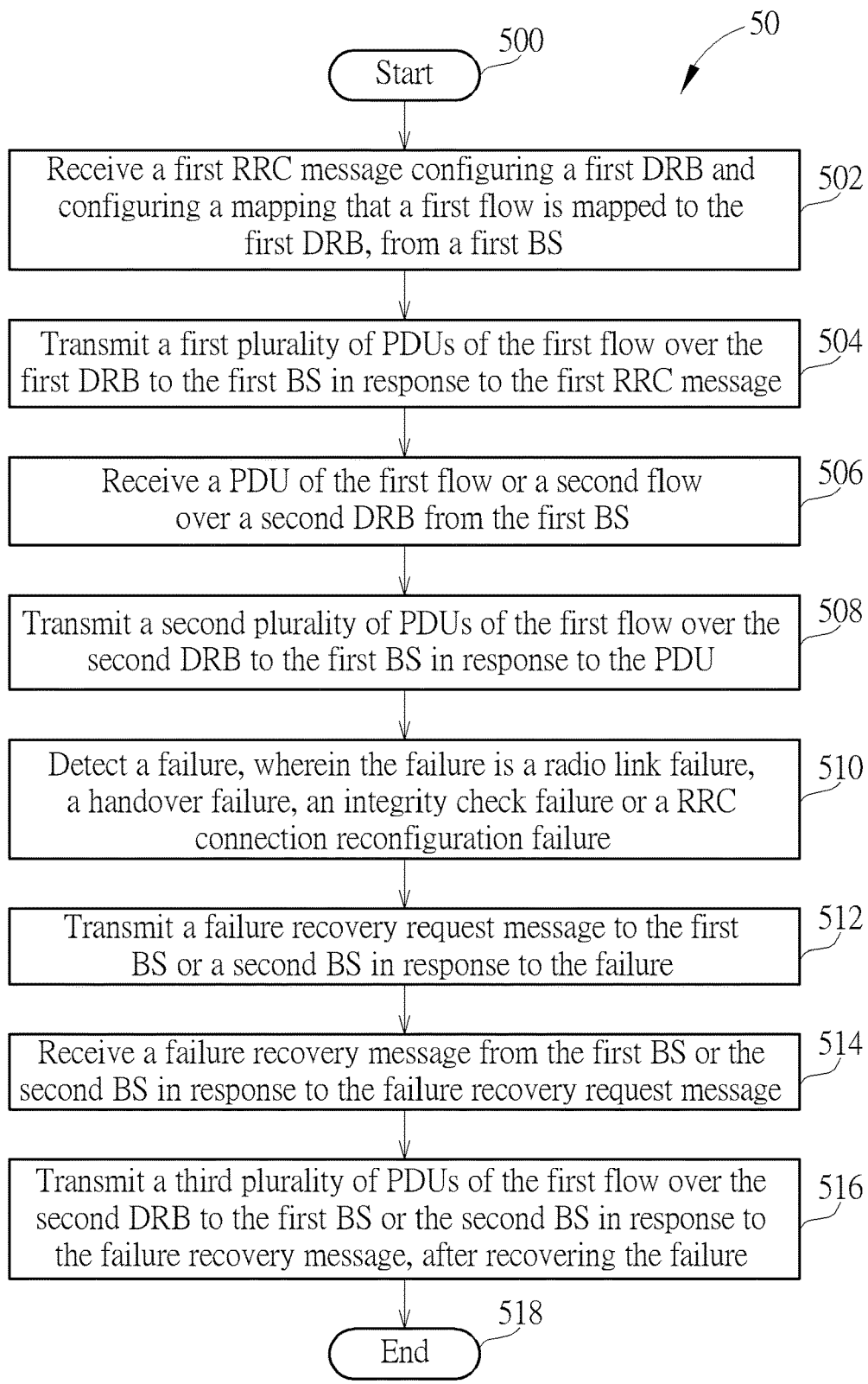
FIG. 5 is a flowchart of a process according to an example of the present invention.

FIG. 5 is a flowchart of a process 50 according to an example of the present invention. The process 50 is utilized in a UE, to handle data transmissions after detecting a failure. The process 50 includes the following steps:

Step 500: Start.

Step 502: Receive a first RRC message configuring a first DRB and configuring a mapping that a first flow is mapped to the first DRB, from a first BS.

Step 504: Transmit a first plurality of PDUs of the first flow over the first DRB to the first BS in response to the first RRC message.

Step 506: Receive a PDU of the first flow or a second flow over a second DRB from the first BS.

Step 508: Transmit a second plurality of PDUs of the first flow over the second DRB to the first BS in response to the PDU.

Step 510: Detect a failure, wherein the failure is a radio link failure, a handover failure, an integrity check failure or a RRC connection reconfiguration failure.

Step 512: Transmit a failure recovery request message to the first BS or a second BS in response to the failure.

Step 514: Receive a failure recovery message from the first BS or the second BS in response to the failure recovery request message.

Step 516: Transmit a third plurality of PDUs of the first flow over the second DRB to the first BS or the second BS in response to the failure recovery message, after recovering the failure.

Step 518: End.

Realization of the process 50 is not limited to the above description. The following examples may be applied to the process 50.

In one example, the first RRC message includes a mapping configuration and a DRB configuration. The mapping configuration configures the mapping. The DRB configuration configures the first DRB. In one example, the first RRC message configures the second DRB. In one example, the UE receives a second RRC message configuring the second DRB from the first BS.

In one example, the first BS transmits the PDU of the first flow or the second flow over the second DRB to the UE, to indicate the UE to transmit a fourth plurality of PDUs of the first flow and the second flow (if configured) over the second DRB. The indication is still valid after the failure is detected, because the second BS receives the indication from the first BS before detecting the failure (due to receiving the failure recovery request message) or before transmitting the failure recovery message. In one example, the second BS receives an updated mapping configuration updated by the first BS from the first BS, before detecting the failure or before transmitting the failure recovery message, wherein the updated mapping configuration configures a mapping that the first flow is mapped to the second DRB. The UE updates the mapping configuration to the updated mapping configuration according to the indication (when received). Thus, the UE transmits a fifth plurality of PDUs of the first flow over the first DRB according to the indication or the updated mapping configuration to the second BS, after recovering the failure. In one example, the first flow and the second flow are configured by the first BS to be aggregated on the first DRB in the first RRC message or the second RRC message.

In one example, the UE releases at least one of a power control configuration and a periodic CQI reporting configuration in response to the failure (or a failure recovery procedure).

In one example, the UE transmits the third plurality of PDUs of the first flow over the second DRB in response to the failure recovery message, when the failure recovery message does not include a mapping configuration indicating that the first flow is mapped to a DRB. That is, the UE does not change the mapping autonomously, when the failure recovery message does not include the mapping configuration. The UE keeps mapping the first flow to the second DRB in response to (or according to) the reception of the PDU from the second DRB during (or after) recovering the failure. That is, the UE knows that the first BS or the second BS (e.g., the network) would like the UE keeping the mapping for the first flow. In one example, the UE transmits the third plurality of PDUs of the first flow over a third DRB in response to the failure recovery message, when the failure recovery message configures a mapping that the first flow is mapped to the third DRB.

The examples of the processes 30-40 may be applied to the process 50, and are not narrated herein.

In one example, the failure recovery message does or does not reconfigure at least one SRB of the RRC connection. In one example, the UE resumes the at least one SRB, when receiving the failure recovery message. The first BS or the second BS transmits the second RRC message in response to the failure recovery complete message. In one example, the second RRC message does or does not reconfigure the first DRB. In one example, the UE resumes the first DRB, when receiving the second RRC message. In one example, the second RRC message does or does not reconfigure the third DRB. In one example, the UE resumes the third DRB, when receiving the second RRC message. Otherwise, the second RRC message may configure the third DRB.

Figure 6:
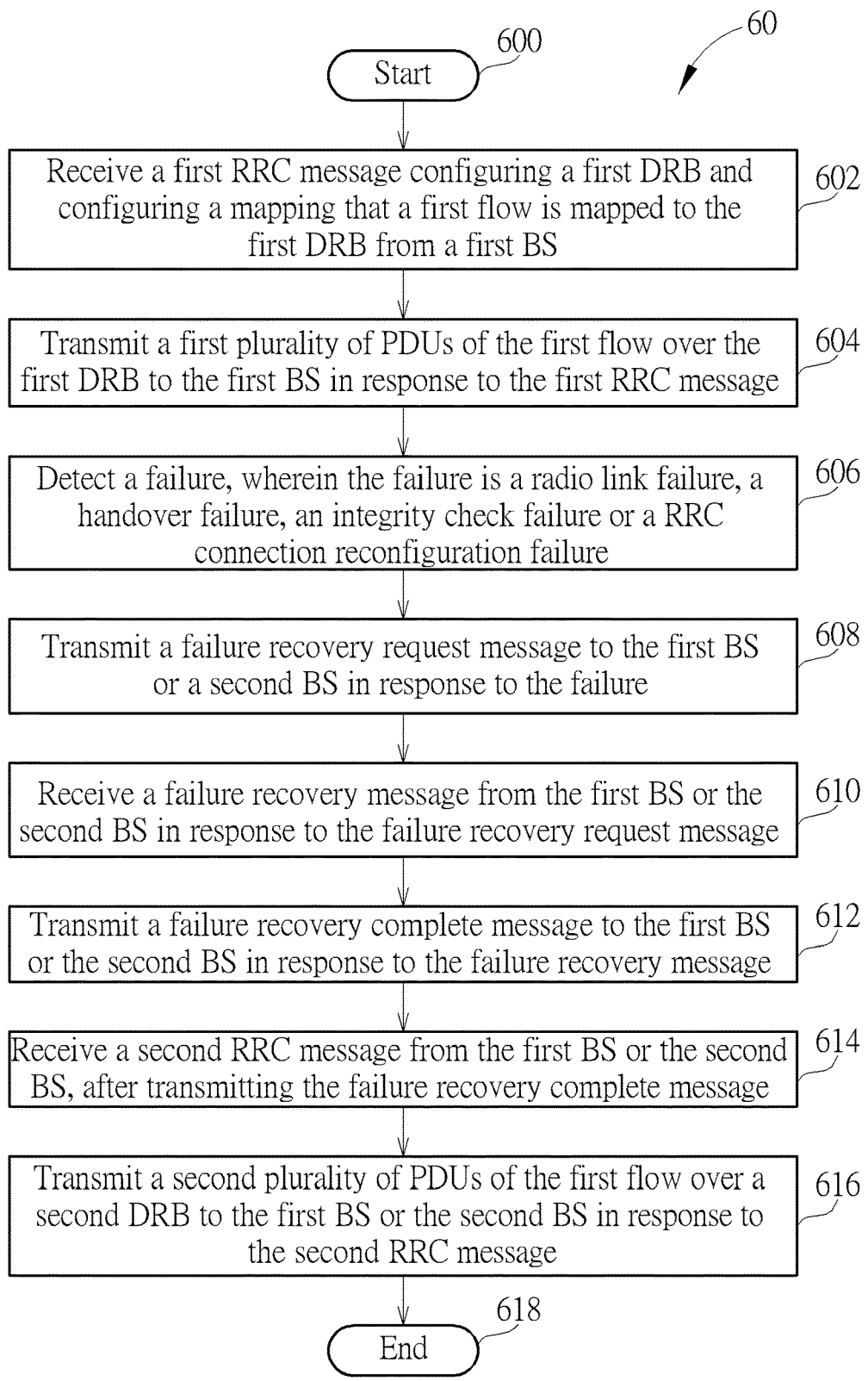
FIG. 6 is a flowchart of a process according to an example of the present invention.

FIG. 6 is a flowchart of a process 60 according to an example of the present invention. The process 60 is utilized in a UE, to handle data transmissions after detecting a failure. The process 60 includes the following steps:

Step 600: Start.

Step 602: Receive a first RRC message configuring a first DRB and configuring a mapping that a first flow is mapped to the first DRB from a first BS.

Step 604: Transmit a first plurality of PDUs of the first flow over the first DRB to the first BS in response to the first RRC message.

Step 606: Detect a failure, wherein the failure is a radio link failure, a handover failure, an integrity check failure or a RRC connection reconfiguration failure.

Step 608: Transmit a failure recovery request message to the first BS or a second BS in response to the failure.

Step 610: Receive a failure recovery message from the first BS or the second BS in response to the failure recovery request message.

Step 612: Transmit a failure recovery complete message to the first BS or the second BS in response to the failure recovery message.

Step 614: Receive a second RRC message from the first BS or the second BS, after transmitting the failure recovery complete message.

Step 616: Transmit a second plurality of PDUs of the first flow over a second DRB to the first BS or the second BS in response to the second RRC message.

Step 618: End.

Realization of the process 60 is not limited to the above description. The following examples may be applied to the process 60.

In one example, the first RRC message includes a mapping configuration and a DRB configuration. The mapping configuration configures the mapping. The DRB configuration configures the first DRB. In one example, the first DRB and the second DRB have different QoSs. The first RRC message or a third RRC message transmitted by the first BS may configure the second DRB, before the failure occurs.

In one example, the UE keeps the mapping configuration and the DRB configuration in response to the failure (or a failure recovery procedure). The mapping configuration may or may not be included in the DRB configuration. In one example, the UE releases a SCell configuration or a SCG configuration in response to the failure (or the failure recovery procedure).

In one example, the second DRB may be a default DRB. The UE transmits the second plurality of PDUs of the first flow over the second DRB in response to the second RRC message, when the failure recovery message does not configure a mapping that the first flow is mapped to the first DRB. In one example, the UE transmits the second plurality of PDUs of the first flow according to the default DRB, when the UE does not have a mapping configuration indicating that the first flow is mapped to a DRB. That is, the UE releases the mapping configuration in response to the failure (or the failure recovery procedure).

In one example, the UE transmits the second plurality of PDUs of the first flow over the first DRB or a third DRB in response to the second RRC message, when the second RRC message configures a mapping from the first flow to the first DRB or the third DRB. In one example, the first DRB and the third DRB are not the default DRB. The first DRB, the second DRB and the third DRB may have different QoSs.

In one example, the first BS or the second BS may transmit the second RRC message in response to the failure recovery complete message. In one example, the second RRC message may or may not reconfigure at least one of the first DRB and the second DRB. In one example, the UE resumes the at least one of the first DRB and the second DRB, when receiving the second RRC message. In one example, the UE transmits the second plurality of PDUs over the second DRB, after resuming the second DRB.

The examples for the processes 30-50 may be applied to the process 60, and are not narrated herein.

Figure 7:
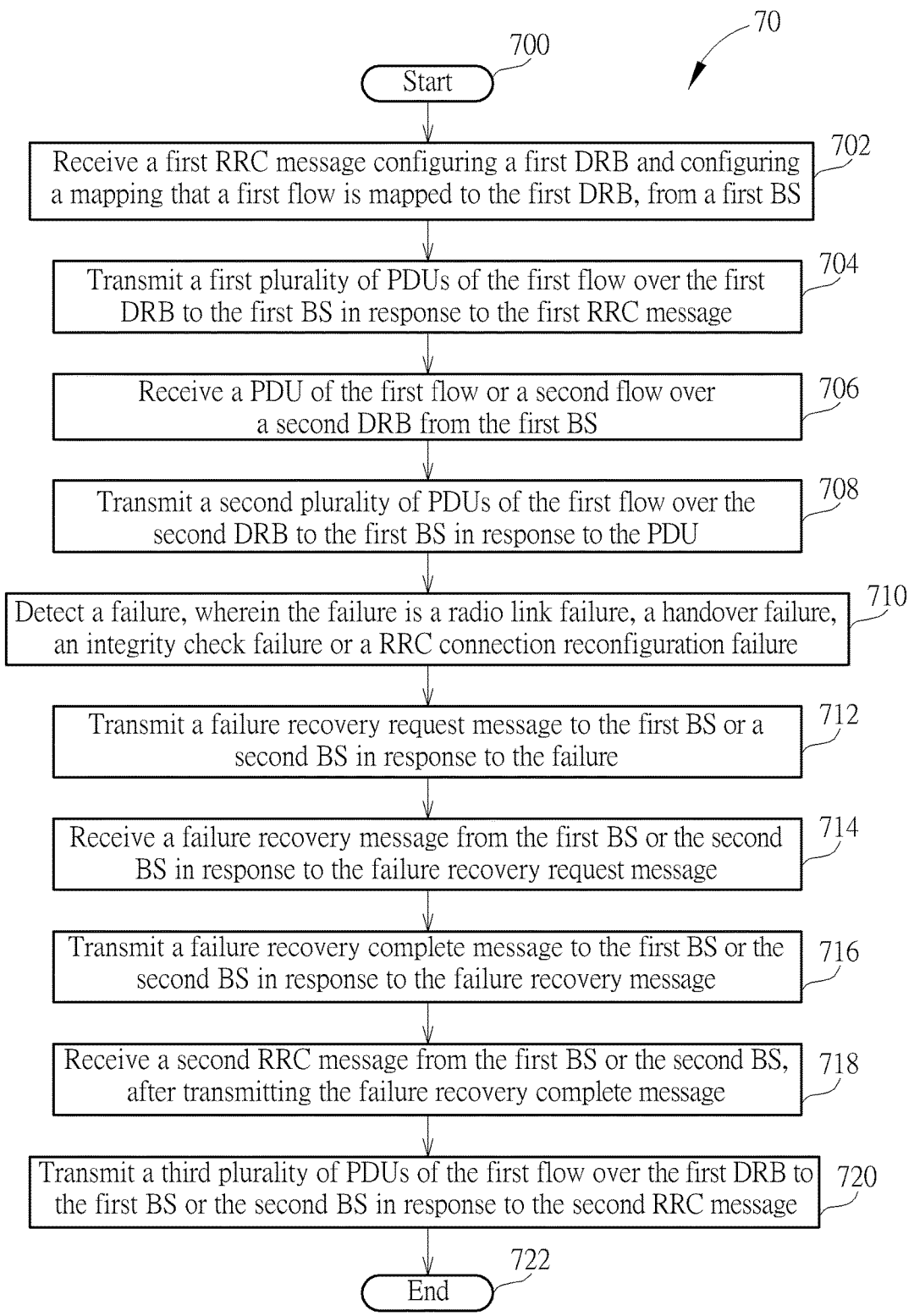
FIG. 7 is a flowchart of a process according to an example of the present invention.

FIG. 7 is a flowchart of a process 70 according to an example of the present invention. The process 70 is utilized in a UE, to handle data transmissions after detecting a failure. The process 70 includes the following steps:

Step 700: Start.

Step 702: Receive a first RRC message configuring a first DRB and configuring a mapping that a first flow is mapped to the first DRB, from a first BS.

Step 704: Transmit a first plurality of PDUs of the first flow over the first DRB to the first BS in response to the first RRC message.

Step 706: Receive a PDU of the first flow or a second flow over a second DRB from the first BS.

Step 708: Transmit a second plurality of PDUs of the first flow over the second DRB to the first BS in response to the PDU.

Step 710: Detect a failure, wherein the failure is a radio link failure, a handover failure, an integrity check failure or a RRC connection reconfiguration failure.

Step 712: Transmit a failure recovery request message to the first BS or a second BS in response to the failure.

Step 714: Receive a failure recovery message from the first BS or the second BS in response to the failure recovery request message.

Step 716: Transmit a failure recovery complete message to the first BS or the second BS in response to the failure recovery message.

Step 718: Receive a second RRC message from the first BS or the second BS, after transmitting the failure recovery complete message.

Step 720: Transmit a third plurality of PDUs of the first flow over the first DRB to the first BS or the second BS in response to the second RRC message.

Step 722: End.

Realization of the process 70 is not limited to the above description. The following examples may be applied to the process 70.

In one example, the first RRC message includes a mapping configuration and a DRB configuration. In one example, the first DRB and the second DRB have different QoSs. The first RRC message or a third RRC message transmitted by the first BS may configure the second DRB, before the failure occurs.

In one example, the UE keeps the mapping configuration and the DRB configuration in response to the failure (or a failure recovery procedure). The mapping configuration may or may not be included in the DRB configuration. In one example, the UE releases a SCell configuration or a SCG configuration in response to the failure (or the failure recovery procedure).

In one example, the first BS transmits the PDU of the first flow or the second flow over the second DRB to the UE, to indicate the UE to transmit a fourth plurality of PDUs of the first flow and the second flow (if configured) over the second DRB. In one example, the UE releases the indication in response to the failure (or the failure recovery procedure). The first BS may not transmit the indication to the second BS.

In one example, the UE transmits the third plurality of PDUs of the first flow over the first DRB, when the second RRC message does not change the mapping. In one example, the UE transmits the third plurality of PDUs of the first flow over a third DRB in response to the second RRC message, when the second RRC message configures a mapping that the first flow is mapped to the third DRB. In one example, the first DRB and the third DRB are not the default DRB. The first DRB, the second DRB and the third DRB may have different QoSs.

In one example, the first BS or the second BS may transmit the second RRC message in response to the failure recovery complete message. In one example, the second RRC message does or does not reconfigure at least one of the first DRB and the second DRB. In one example, the UE resumes the at least one of the first DRB and the second DRB, when receiving the second RRC message. In one example, the UE transmits the third plurality of PDUs over the second DRB, after resuming the second DRB.

The examples of the processes 30-60 may be applied to the process 70, and are not narrated herein.

Figure 8:
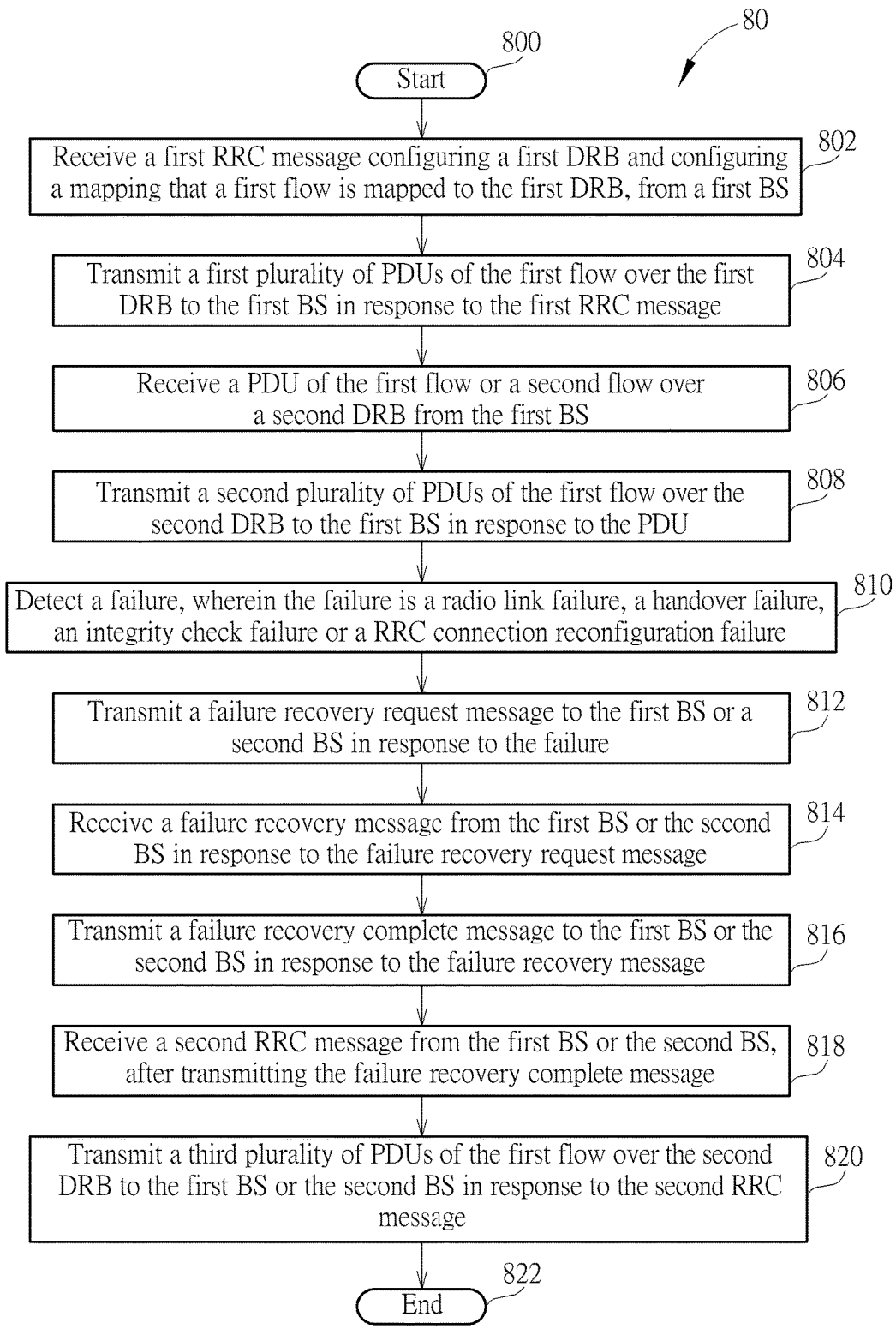
FIG. 8 is a flowchart of a process according to an example of the present invention.

FIG. 8 is a flowchart of a process 80 according to an example of the present invention. The process 80 is utilized in a UE, to handle data transmissions after detecting a failure. The process 80 includes the following steps:

Step 800: Start.

Step 802: Receive a first RRC message configuring a first DRB and configuring a mapping that a first flow is mapped to the first DRB, from a first BS.

Step 804: Transmit a first plurality of PDUs of the first flow over the first DRB to the first BS in response to the first RRC message.

Step 806: Receive a PDU of the first flow or a second flow over a second DRB from the first BS.

Step 808: Transmit a second plurality of PDUs of the first flow over the second DRB to the first BS in response to the PDU.

Step 810: Detect a failure, wherein the failure is a radio link failure, a handover failure, an integrity check failure or a RRC connection reconfiguration failure.

Step 812: Transmit a failure recovery request message to the first BS or a second BS in response to the failure.

Step 814: Receive a failure recovery message from the first BS or the second BS in response to the failure recovery request message.

Step 816: Transmit a failure recovery complete message to the first BS or the second BS in response to the failure recovery message.

Step 818: Receive a second RRC message from the first BS or the second BS, after transmitting the failure recovery complete message.

Step 820: Transmit a third plurality of PDUs of the first flow over the second DRB to the first BS or the second BS in response to the second RRC message.

Step 822: End.

Realization of the process 80 is not limited to the above description. The following examples may be applied to the process 80.

In one example, the first BS transmits the PDU of the first flow or the second flow over the second DRB to the UE, to indicate the UE to transmit a fourth plurality of PDUs of the first flow and the second flow (if configured) over the second DRB. The indication may be still valid after the failure is detected, because the second BS receives the indication from the first BS. In one example, the second BS receives an updated mapping configuration updated by the first BS from the first BS, wherein the updated mapping configuration configures a mapping that the first flow is mapped to the second DRB. The UE may update the mapping configuration to the updated mapping configuration according to the indication. Thus, the UE transmits a fifth plurality of PDUs of the first flow over the first DRB according to the indication or the updated mapping configuration to the second BS in respond to the second RRC message. In one example, the first flow and the second flow are configured by the first BS to be aggregated on the same DRB in the first RRC message or the third RRC message.

In one example, the UE transmits the third plurality of PDUs of the first flow over a third DRB in response to the second RRC message, when the second RRC message configures a mapping that the first flow is mapped to the third DRB. In one example, the first DRB and the third DRB are not the default DRB. The first DRB, the second DRB and the third DRB may have different QoSs.

In one example, the failure recovery message does or does not reconfigure at least one SRB of the RRC connection. In one example, the UE resumes the least one SRB, when receiving the failure recovery message. The first BS or the second BS may transmit the second RRC message in response to the failure recovery complete message. In one example, the second RRC message does or does not reconfigure at least one of the first DRB and the second DRB. The UE resumes the at least one of the first DRB and the second DRB, when receiving the second RRC message. In one example, the UE transmits the third plurality of PDUs over the second DRB, after resuming the second DRB.

The examples for the process 80 can be referred to the previous description related to the processes 30-70, and are not narrated herein.

Figure 9:
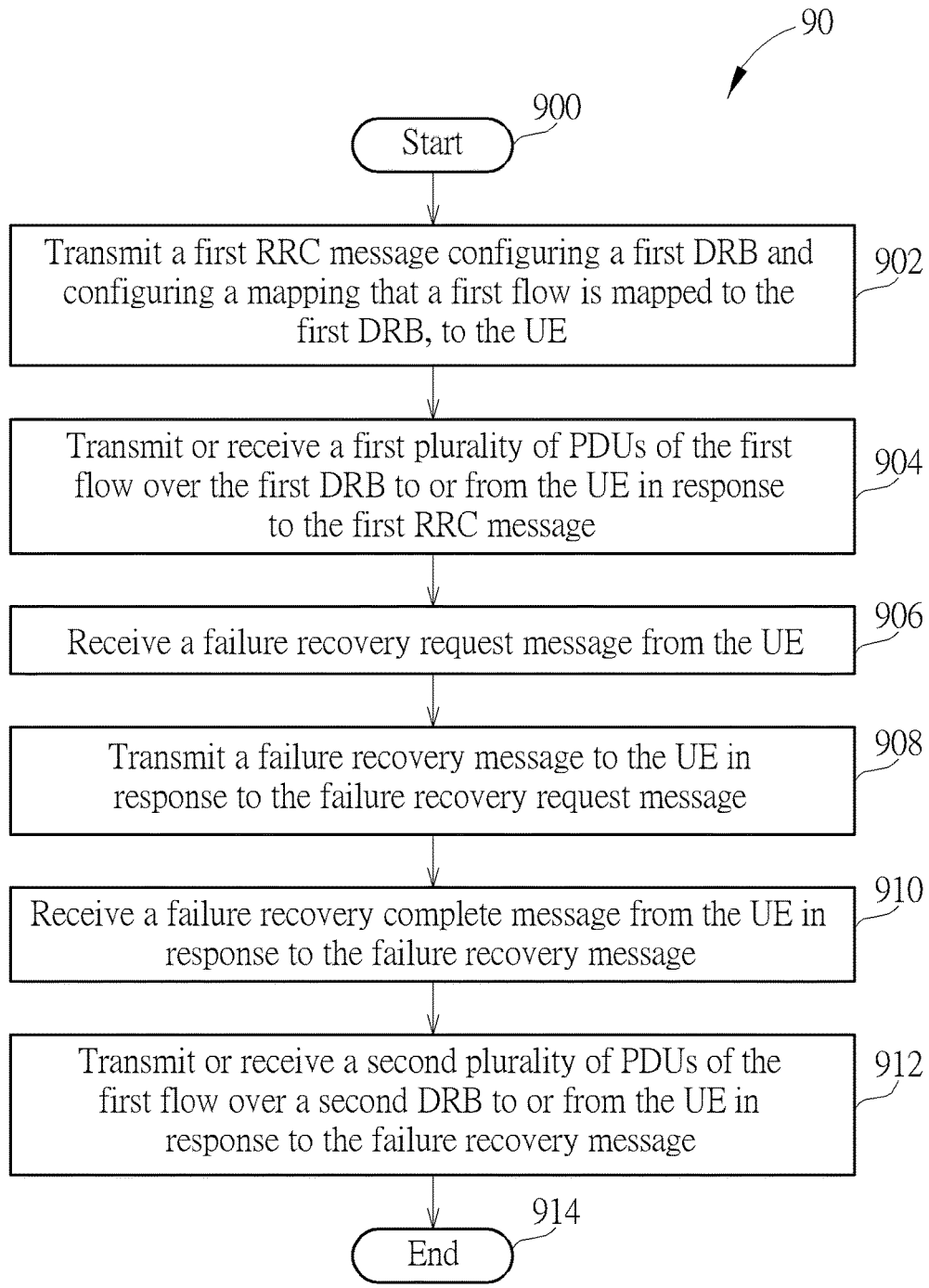
FIG. 9 is a flowchart of a process according to an example of the present invention.

FIG. 9 is a flowchart of a process 90 according to an example of the present invention. The process 90 is utilized in a network in FIG. 1 which includes at least one of a first BS and a second BS, to transmit data to a UE. The process 90 includes the following steps:

Step 900: Start.

Step 902: Transmit a first RRC message configuring a first DRB and configuring a mapping that a first flow is mapped to the first DRB, to the UE.

Step 904: Communicate a first plurality of PDUs of the first flow over the first DRB with the UE in response to the first RRC message.

Step 906: Receive a failure recovery request message from the UE.

Step 908: Transmit a failure recovery message to the UE in response to the failure recovery request message.

Step 910: Receive a failure recovery complete message from the UE in response to the failure recovery message.

Step 912: Communicate a second plurality of PDUs of the first flow over a second DRB with the UE in response to the failure recovery message.

Step 914: End.

According to the process 90, the network (i.e., the first BS) transmits a first RRC message configuring a first DRB and configuring a mapping that a first flow is mapped to the first DRB, to the UE. Then, the network (i.e., the first BS) communicates (e.g., transmits or receives) a first plurality of PDUs of the first flow over the first DRB with (e.g., to or from) the UE in response to the first RRC message. The network (i.e., one of the first BS and the second BS) receives a failure recovery request message from the UE, transmits a failure recovery message to the UE in response to the failure recovery request message and receives a failure recovery complete message from the UE in response to the failure recovery message. Then, the network (i.e., the one of the first BS and the second BS) communicates a second plurality of PDUs of the first flow over a second DRB with the UE in response to the failure recovery message (or the failure recovery complete message).

Realization of the process 90 is not limited to the above description. The following examples may be applied to the process 90.

In one example, the first RRC message includes a mapping configuration and a DRB configuration as described above.

In one example, the network releases at least one of a power control configuration and a periodic CQI reporting configuration in response to the failure (or a failure recovery procedure).

In one example, the network keeps the DRB configuration in response to the failure (or the failure recovery procedure). In one example, the network releases the mapping configuration and keeps at least one configuration (e.g., a DRB identity, a RLC configuration, etc.) in the DRB configuration, if the mapping configuration is included in the DRB configuration. In one example, the network releases the mapping configuration and keeps at least one configuration in a PDCP configuration, if the mapping configuration is included in the PDCP configuration.

In one example, the UE is configured with an identifier (e.g., RNTI) for monitoring a control channel transmitted by the network for scheduling at least one of UL transmission(s) and DL transmission(s), before detecting the failure. The network may keep the identifier for the UE in response to the failure (or the failure recovery procedure).

In one example, the second DRB may be a default DRB. In one example, the network transmits the second plurality of PDUs of the first flow over the second DRB, when the failure recovery message does not configure a mapping that the first flow is mapped to the first DRB. In one example, the network transmits the second plurality of PDUs of the first flow according to the default DRB, when the network does not have a mapping configuration indicating that the first flow is mapped to a DRB. That is, the network releases the mapping configuration in response to the failure (or the failure recovery procedure).

In one example, the network transmits the second plurality of PDUs of the first flow over the first DRB or a third DRB in response to the failure recovery message, when the failure recovery message configures a mapping that the first flow is mapped to the first DRB or the third DRB.

The examples of the process 30 may be applied to the process 90, and are not narrated herein.

Figure 10:
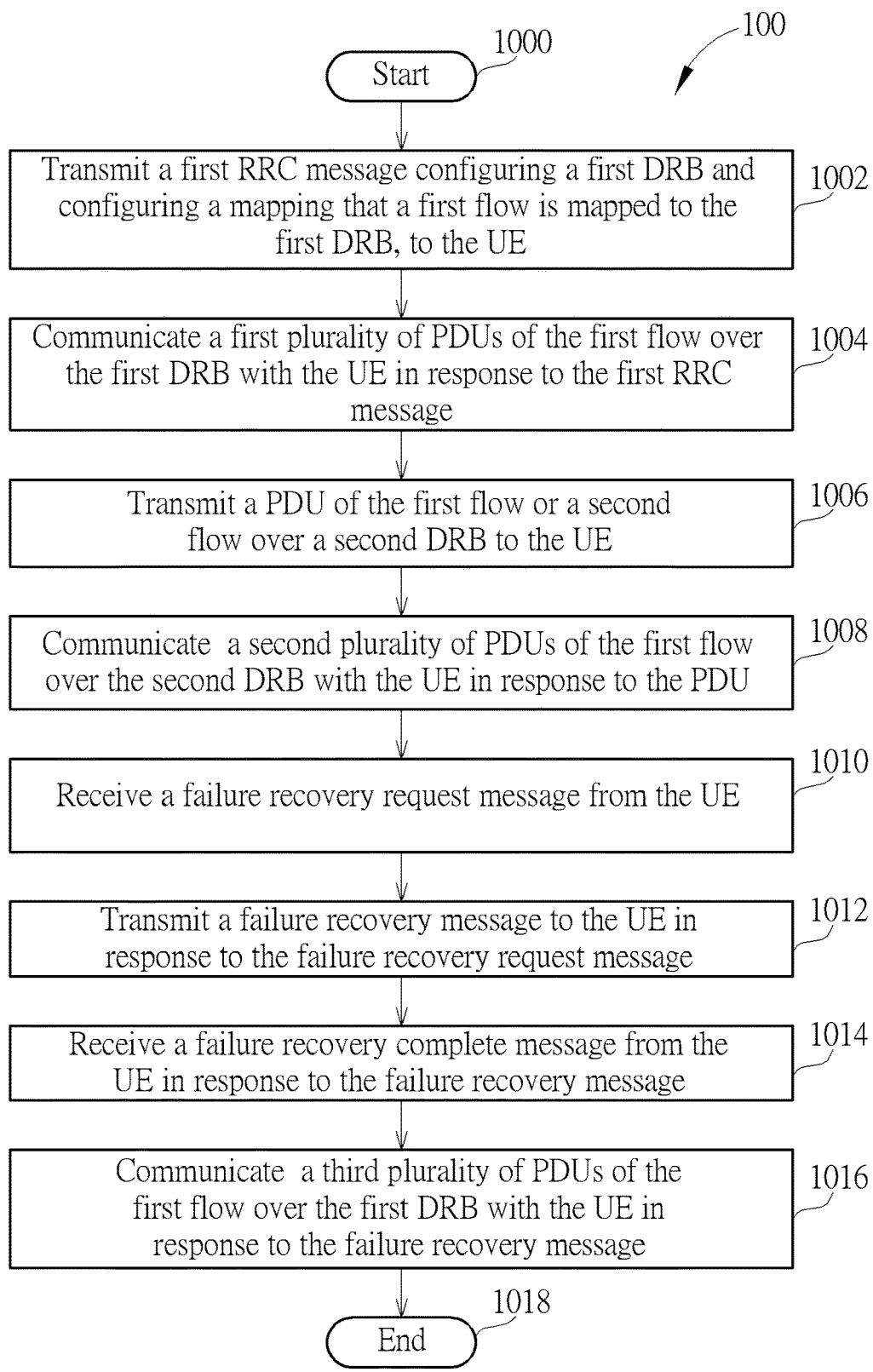
FIG. 10 is a flowchart of a process according to an example of the present invention.

FIG. 10 is a flowchart of a process 100 according to an example of the present invention. The process 100 is utilized in a network in FIG. 1 which includes at least one of a first BS and a second BS, to transmit data to a UE. The process 100 includes the following steps:

Step 1000: Start.

Step 1002: Transmit a first RRC message configuring a first DRB and configuring a mapping that a first flow is mapped to the first DRB, to the UE.

Step 1004: Communicate a first plurality of PDUs of the first flow over the first DRB with the UE in response to the first RRC message.

Step 1006: Transmit a PDU of the first flow or a second flow over a second DRB to the UE.

Step 1008: Communicate a second plurality of PDUs of the first flow over the second DRB with the UE in response to the PDU.

Step 1010: Receive a failure recovery request message from the UE.

Step 1012: Transmit a failure recovery message to the UE in response to the failure recovery request message.

Step 1014: Receive a failure recovery complete message from the UE in response to the failure recovery message.

Step 1016: Communicate a third plurality of PDUs of the first flow over the first DRB with the UE in response to the failure recovery message.

Step 1018: End.

According to the process 100, the network (i.e., the first BS) transmits a first RRC message configuring a first DRB and configuring a mapping that a first flow is mapped to the first DRB to the UE. Then, the network (i.e., the first BS) communicates (e.g., transmits or receives) a first plurality of PDUs of the first flow over the first DRB with (e.g., to or from) the UE in response to the first RRC message. The network (i.e., the first BS) transmits a PDU of the first flow or a second flow over a second DRB to the UE. The network (i.e., the first BS) communicates a second plurality of PDUs of the first flow over the second DRB with the UE in response to the PDU. The network (i.e., one of the first BS and the second BS) receives a failure recovery request message from the UE, transmits a failure recovery message to the UE in response to the failure recovery request message and receives a failure recovery complete message from the UE in response to the failure recovery message. Then, the network (i.e., the one of the first BS and the second BS) communicates a third plurality of PDUs of the first flow over the first DRB with the UE in response to the failure recovery message (or the failure recovery complete message).

The examples of the process 40 may be applied to the process 100, and are not narrated herein.

Figure 11:
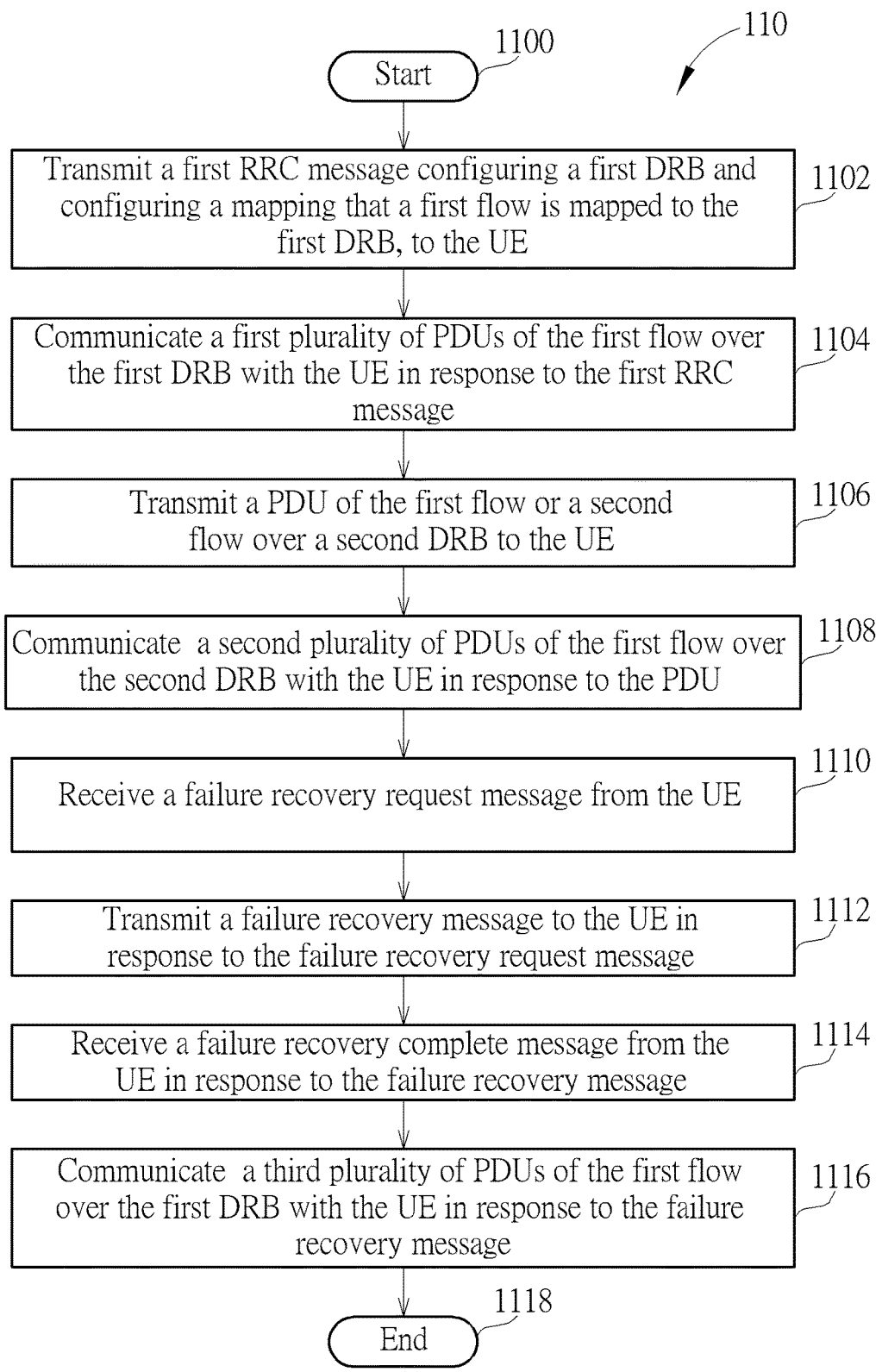
FIG. 11 is a flowchart of a process according to an example of the present invention.

FIG. 11 is a flowchart of a process 110 according to an example of the present invention. The process 110 is utilized in a network in FIG. 1 which includes at least one of a first BS and a second BS, to transmit data to a UE. The process 110 includes the following steps:

Step 1100: Start.

Step 1102: Transmit a first RRC message configuring a first DRB and configuring a mapping that a first flow is mapped to the first DRB, to the UE.

Step 1104: Communicate a first plurality of PDUs of the first flow over the first DRB with the UE in response to the first RRC message.

Step 1106: Transmit a PDU of the first flow or a second flow over a second DRB to the UE.

Step 1108: Communicate a second plurality of PDUs of the first flow over the second DRB with the UE in response to the PDU.

Step 1110: Receive a failure recovery request message from the UE.

Step 1112: Transmit a failure recovery message to the UE in response to the failure recovery request message.

Step 1114: Receive a failure recovery complete message from the UE in response to the failure recovery message.

Step 1116: Communicate a third plurality of PDUs of the first flow over the second DRB with the UE in response to the failure recovery message.

Step 1118: End.

According to the process 110, the network (i.e., the first BS) transmits a first RRC message configuring a first DRB and configuring a mapping that a first flow is mapped to the first DRB, to the UE. Then, the network (i.e., the first BS) communicates (e.g., transmits or receives) a first plurality of PDUs of the first flow over the first DRB with (e.g., to or from) the UE in response to the first RRC message. The network (i.e., the first BS) transmits a PDU of the first flow or a second flow over a second DRB to the UE. The network (i.e., the first BS) communicates a second plurality of PDUs of the first flow over the second DRB with the UE in response to the PDU. The network (i.e., one of the first BS and the second BS) receives a failure recovery request message from the UE, transmits a failure recovery message to the UE in response to the failure recovery request message and receives a failure recovery complete message from the UE in response to the failure recovery message. Then, the network (i.e., the one of the first BS and the second BS) communicates a third plurality of PDUs of the first flow over the second DRB with the UE in response to the failure recovery complete message (or the failure recovery complete message).

The examples of the process 50 may applied to the process 110, and are not narrated herein.

Figure 12:
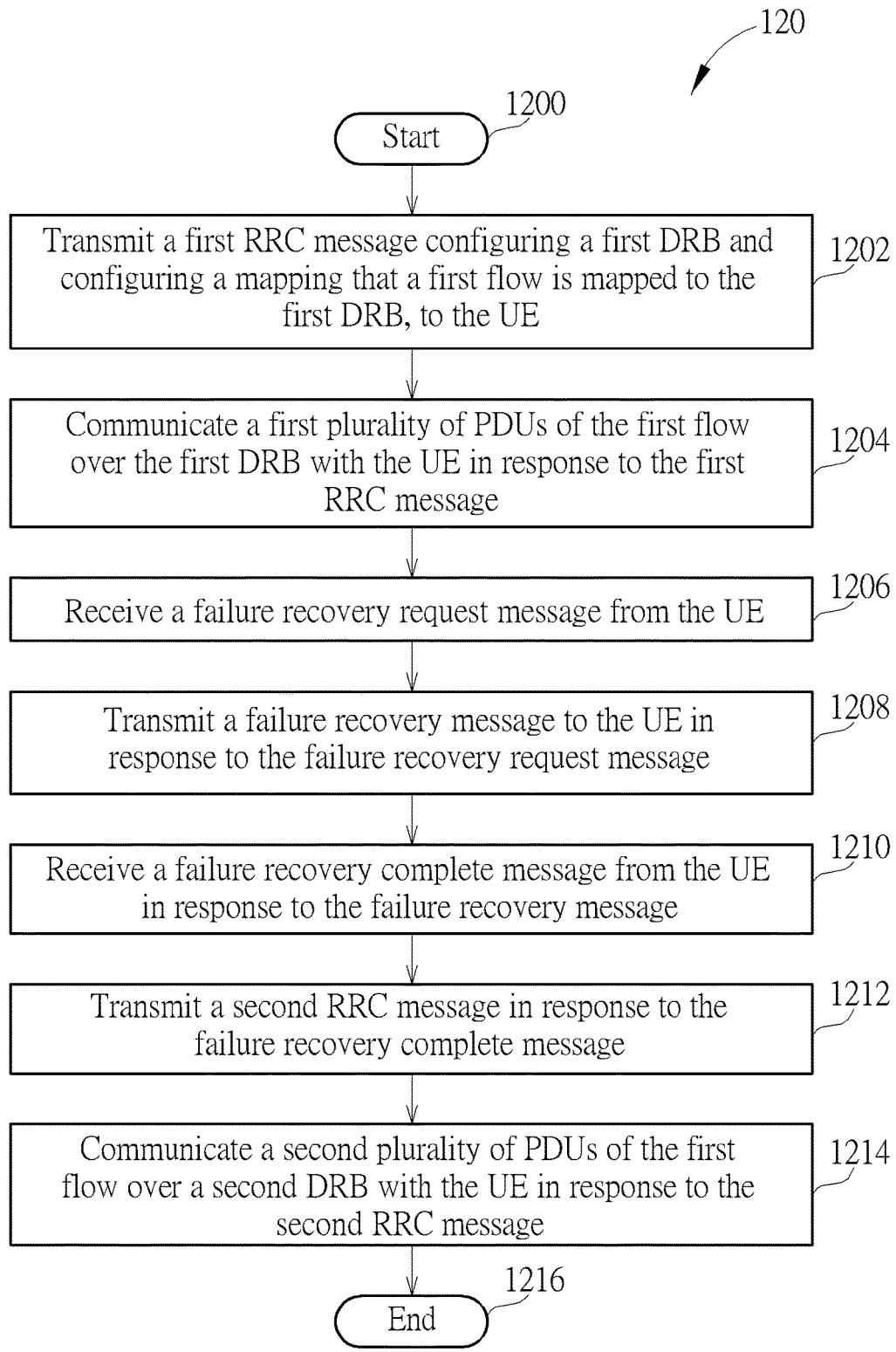
FIG. 12 is a flowchart of a process according to an example of the present invention.

FIG. 12 is a flowchart of a process 120 according to an example of the present invention. The process 120 is utilized in a network in FIG. 1 which includes at least one of a first BS and a second BS, to transmit data to a UE. The process 120 includes the following steps:

Step 1200: Start.

Step 1202: Transmit a first RRC message configuring a first DRB and configuring a mapping that a first flow is mapped to the first DRB, to the UE.

Step 1204: Communicate a first plurality of PDUs of the first flow over the first DRB with the UE in response to the first RRC message.

Step 1206: Receive a failure recovery request message from the UE.

Step 1208: Transmit a failure recovery message to the UE in response to the failure recovery request message.

Step 1210: Receive a failure recovery complete message from the UE in response to the failure recovery message.

Step 1212: Transmit a second RRC message in response to the failure recovery complete message.

Step 1214: Communicate a second plurality of PDUs of the first flow over a second DRB with the UE in response to the second RRC message.

Step 1216: End.

According to the process 120, the network (i.e., the first BS) transmits a first RRC message configuring a first DRB and configuring a mapping that a first flow is mapped to the first DRB, to the UE. Then, the network (i.e., the first BS) communicates (e.g., transmits or receives) a first plurality of PDUs of the first flow over the first DRB with (e.g., to or from) the UE in response to the first RRC message. The network (i.e., one of the first BS and the second BS) receives a failure recovery request message from the UE, transmits a failure recovery message to the UE in response to the failure recovery request message and receives a failure recovery complete message from the UE in response to the failure recovery message. The network (i.e., one of the first BS and the second BS) transmits a second RRC message in response to the failure recovery complete message. Then, the network (i.e., the one of the first BS and the second BS) communicates a second plurality of PDUs of the first flow over a second DRB with the UE in response to the second RRC message.

Realization of the process 120 is not limited to the above description. The following examples may be applied to the process 120.

In one example, the first RRC message includes a mapping configuration and a DRB configuration. In one example, the first DRB and the second DRB have different QoSs.

In one example, the network releases at least one of a power control configuration and a periodic CQI reporting configuration in response to the failure (or a failure recovery procedure).

In one example, the network keeps the DRB configuration in response to the failure (or the failure recovery procedure). In one example, the network releases the mapping configuration and keeps at least one configuration (e.g., a DRB identity, a RLC configuration, etc.) in the DRB configuration, if the mapping configuration is included in the DRB configuration. In one example, the network releases the mapping configuration and keeps at least one configuration in a PDCP configuration, if the mapping configuration is included in the PDCP configuration.

In one example, the UE is configured an identifier (e.g., RNTI) for monitoring a control channel transmitted by the network for scheduling at least one of UL transmission (s) and DL transmission (s), before detecting the failure. The network may keep the identifier for the UE in response to the failure (or the failure recovery procedure).

In one example, the second DRB may be a default DRB. The default DRB may be configured in the first RRC message or a third RRC message transmitted to the UE, before detecting the failure. In one example, the network transmits the second plurality of PDUs of the first flow over the second DRB, when the failure recovery message does not configure a mapping that the first flow is mapped to the first DRB. In one example, the network transmits the second plurality of PDUs of the first flow according to the default DRB, when the network does not have a mapping configuration indicating that the first flow is mapped to a DRB. That is, the network releases the mapping configuration in response to the failure (or the failure recovery procedure).

In one example, the network transmits the second plurality of PDUs of the first flow over the first DRB or a third DRB in response to the failure recovery message, when the failure recovery message configures a mapping that from the first flow is mapped to the first DRB or the third DRB. In one example, the first DRB and the third DRB are not the default DRB. The first DRB, the second DRB and the third DRB have different QoSs.

The examples of the process 60 may be applied to the process 120, and are not narrated herein.

Figure 13:
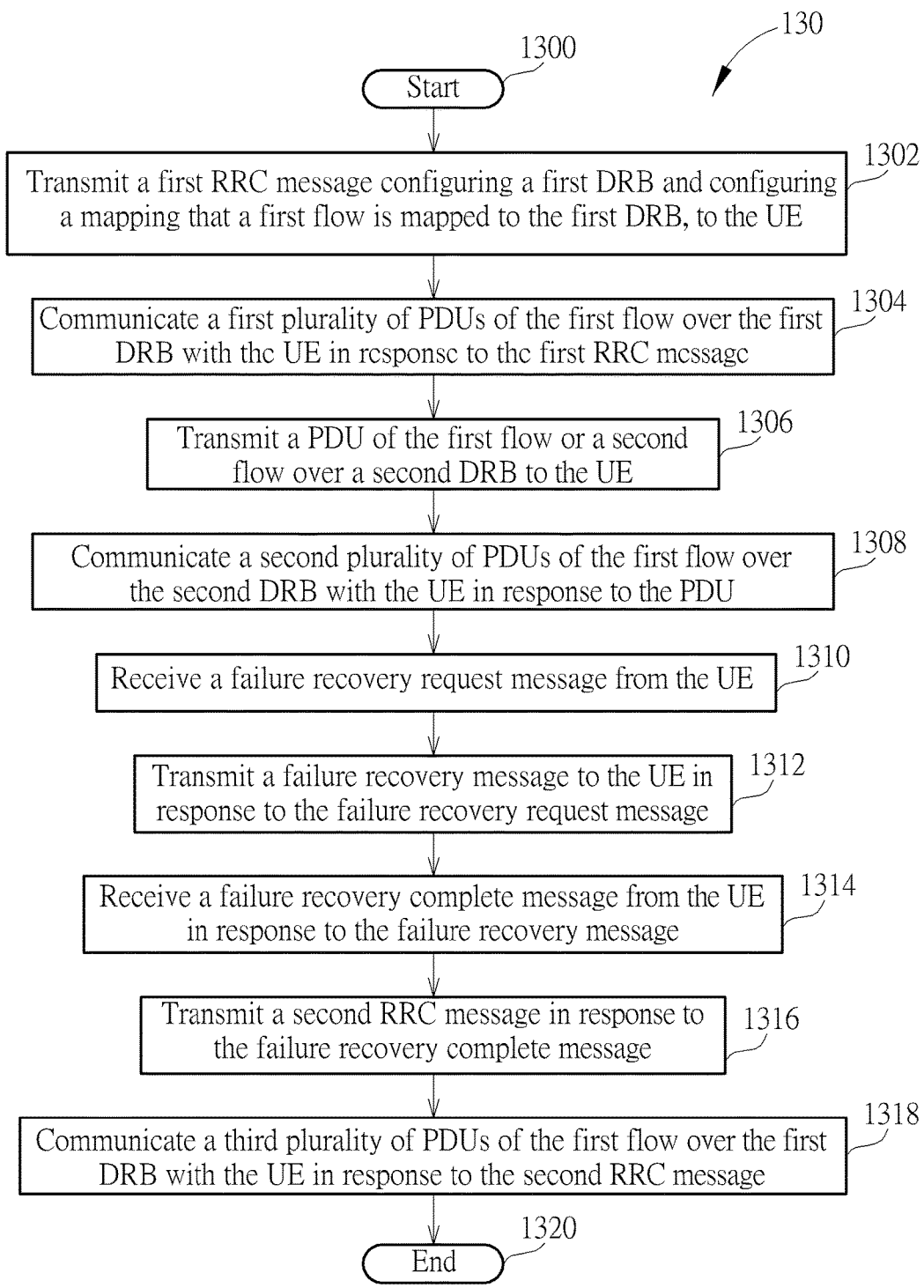
FIG. 13 is a flowchart of a process according to an example of the present invention.

FIG. 13 is a flowchart of a process 130 according to an example of the present invention. The process 130 is utilized in a network in FIG. 1 which includes at least one of a first BS and a second BS, to transmit data to a UE. The process 130 includes the following steps:

Step 1300: Start.

Step 1302: Transmit a first RRC message configuring a first DRB and configuring a mapping that a first flow is mapped to the first DRB, to the UE.

Step 1304: Communicate a first plurality of PDUs of the first flow over the first DRB with the UE in response to the first RRC message.

Step 1306: Transmit a PDU of the first flow or a second flow over a second DRB to the UE.

Step 1308: Communicate a second plurality of PDUs of the first flow over the second DRB with the UE in response to the PDU.

Step 1310: Receive a failure recovery request message from the UE.

Step 1312: Transmit a failure recovery message to the UE in response to the failure recovery request message.

Step 1314: Receive a failure recovery complete message from the UE in response to the failure recovery message.

Step 1316: Transmit a second RRC message in response to the failure recovery complete message.

Step 1318: Communicate a third plurality of PDUs of the first flow over the first DRB with the UE in response to the second RRC message.

Step 1320: End.

According to the process 130, the network (i.e., the first BS) transmits a first RRC message configuring a first DRB and configuring a mapping that a first flow is mapped to the first DRB, to the UE. Then, the network (i.e., the first BS) communicates (e.g., transmits or receives) a first plurality of PDUs of the first flow over the first DRB with (e.g., to or from) the UE in response to the first RRC message. The network (i.e., the first BS) transmits a PDU of the first flow or a second flow over a second DRB to the UE. The network (i.e., the first BS) communicates a second plurality of PDUs of the first flow over the second DRB with the UE in response to the PDU. The network (i.e., one of the first BS and the second BS) receives a failure recovery request message from the UE, transmits a failure recovery message to the UE in response to the failure recovery request message and receives a failure recovery complete message from the UE in response to the failure recovery message. The network (i.e., one of the first BS and the second BS) transmits a second RRC message in response to the failure recovery complete message. Then, the network (i.e., the one of the first BS and the second BS) communicates a third plurality of PDUs of the first flow over the first DRB with the UE in response to the second RRC message.

Realization of the process 130 is not limited to the above description. The following examples may be applied to the process 130.

In one example, the first BS transmits the PDU of the first flow or the second flow over the second DRB to the UE, to indicate the UE to transmit a fourth plurality of PDUs of the first flow and the second flow (if configured) over the second DRB. After the failure is recovered, the indication is not valid, because the second BS is not aware of the indication. That is, the first BS does not transmit the indication to the second BS. Thus, the UE and the network transmit a fifth plurality of PDUs on the first DRB according to the mapping configuration. In one example, the first flow and the second flow is configured by the first BS to be aggregated on the same DRB in the first RRC message or a third RRC message.

The examples of the process 70 may applied to the process 130, and are not narrated herein.

Figure 14:
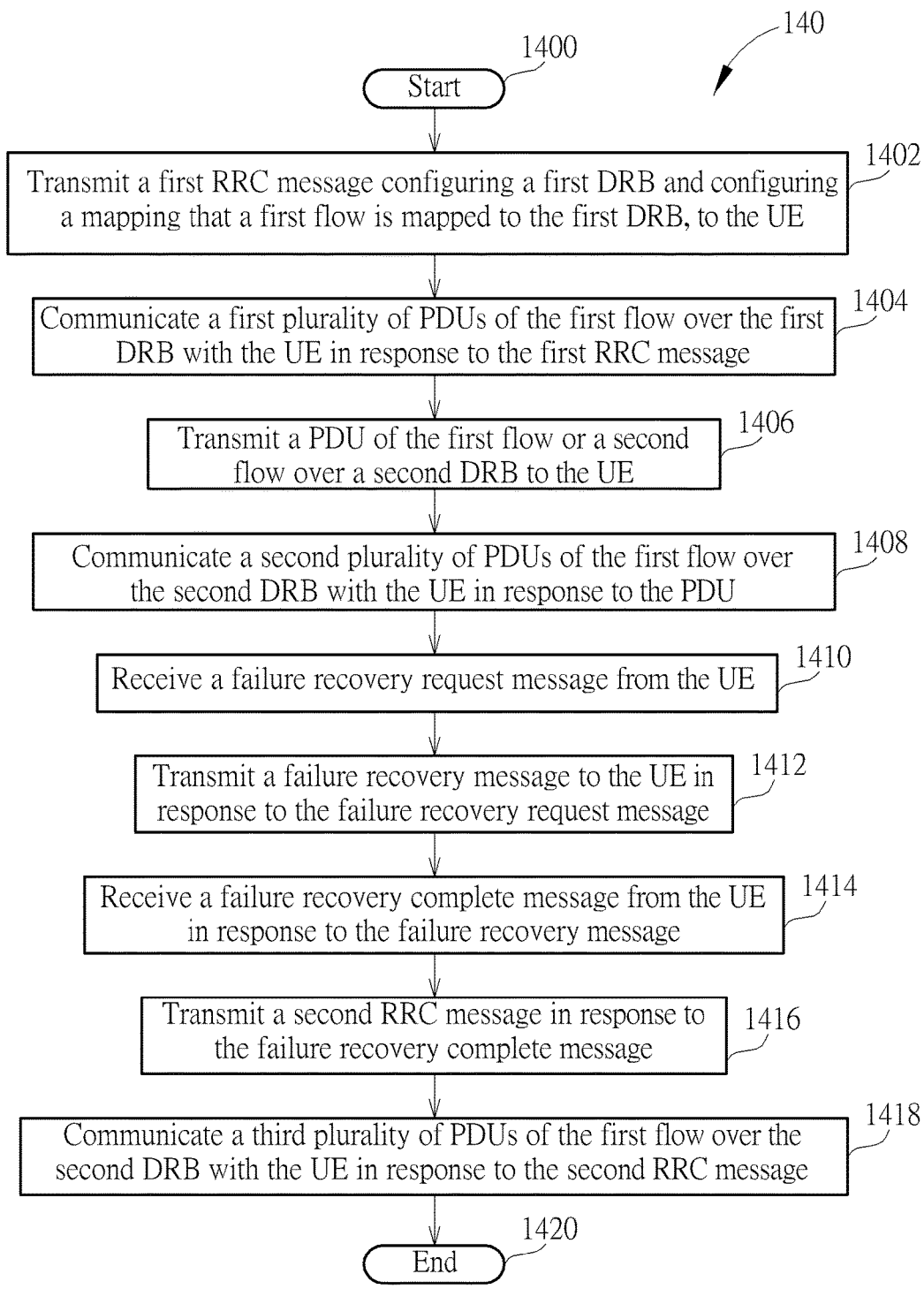
FIG. 14 is a flowchart of a process according to an example of the present invention.

FIG. 14 is a flowchart of a process 140 according to an example of the present invention. The process 140 is utilized in a network in FIG. 1 which includes at least one of a first BS and a second BS, to transmit data to a UE. The process 140 includes the following steps:

Step 1400: Start.

Step 1402: Transmit a first RRC message configuring a first DRB and configuring a mapping that a first flow is mapped to the first DRB, to the UE.

Step 1404: Communicate a first plurality of PDUs of the first flow over the first DRB with the UE in response to the first RRC message.

Step 1406: Transmit a PDU of the first flow or a second flow over a second DRB to the UE.

Step 1408: Communicate a second plurality of PDUs of the first flow over the second DRB with the UE in response to the PDU.

Step 1410: Receive a failure recovery request message from the UE.

Step 1412: Transmit a failure recovery message to the UE in response to the failure recovery request message.

Step 1414: Receive a failure recovery complete message from the UE in response to the failure recovery message.

Step 1416: Transmit a second RRC message in response to the failure recovery complete message.

Step 1418: Communicate a third plurality of PDUs of the first flow over the second DRB with the UE in response to the second RRC message.

Step 1420: End.

According to the process 140, the network (i.e., the first BS) transmits a first RRC message configuring a first DRB and configuring a mapping that a first flow is mapped to the first DRB to the UE. Then, the network (i.e., the first BS) communicates (e.g., transmits or receives) a first plurality of PDUs of the first flow over the first DRB with (e.g., to or from) the UE in response to the first RRC message. The network (i.e., the first BS) transmits a PDU of the first flow or a second flow over a second DRB to the UE. The network (i.e., the first BS) communicates a second plurality of PDUs of the first flow over the second DRB with the UE in response to the PDU. The network (i.e., one of the first BS and the second BS) receives a failure recovery request message from the UE, transmits a failure recovery message to the UE in response to the failure recovery request message and receives a failure recovery complete message from the UE in response to the failure recovery message. The network (i.e., one of the first BS and the second BS) transmits a second RRC message in response to the failure recovery complete message. Then, the network (i.e., the one of the first BS and the second BS) communicates a third plurality of PDUs of the first flow over the second DRB with the UE in response to the second RRC message.

Realization of the process 140 is not limited to the above description. The following examples may be applied to the process 140.

In one example, the first BS transmits the PDU of the first flow or the second flow over the second DRB to the UE, to indicate the UE to transmit a fourth plurality of PDUs of the first flow and the second flow (if configured) over the second DRB. The indication is still valid after the failure is recovered, because the second BS receives the indication from the first BS. In one example, the second BS receives an updated mapping configuration updated by the first BS from the first BS, wherein the updated mapping configuration configures a mapping that the first flow is mapped to the second DRB. The UE updates the mapping configuration to the updated mapping configuration according to the indication. Thus, the UE and the network transmit a fifth plurality of PDUs of the first flow over the second DRB according to the indication or the updated mapping configuration to the second BS, after recovering the failure. In one example, the first flow and the second flow are configured by the first BS to be aggregated on the same DRB in the first RRC message or the third RRC message.

The examples of the process 80 may be applied to the process 140, and are not narrated herein.

Realization of the processes 30-140 is not limited to the above description. The following examples may be applied to the processes 30-140.

In one example, the failure recovery request message is a RRCConnectionReestablishmentRequest message, the failure recovery message is a RRCConnectionReestablishment message, and the failure recovery complete message is a RRCConnectionReestablishmentComplete message. In one example, the failure recovery request message is a RRCConnectionResumeRequest message, the failure recovery message is a RRCConnectionResume message, and the failure recovery complete message is a RRCConnectionResumeComplete message. In one example, the failure recovery request message is a RRCConnectionRequest message, the failure recovery message is a RRCConnectionSetup message, and the failure recovery complete message is a RRCConnectionSetupComplete message.

In one example, the PDU is a PDCP PDU. The PDCP PDU contains a flow identity (e.g., a QoS flow identity) assigned by the network for the first flow (e.g., a QoS flow or an IP flow) and a PDCP service data unit (SDU). The flow identity is in the mapping configuration. The PDCP PDU contains an IP packet. When receiving a PDCP PDU, the UE may know (or determine) a PDCP SDU included in the PDCP PDU belongs to a flow according to the flow identity.

In one example, the PDCP configuration includes at least one of a sequence number size, a discard timer value, a using RLC acknowledged mode and a using RLC unacknowledged mode. In one example, the DRB configuration includes at least one of a DRB identity, an IP flow identity, a QoS flow identity, a PDCP configuration and a RLC configuration.

In one example, a flow (e.g., the first flow or the second flow) may be a QoS flow identified by the QoS flow identity. In one example, the flow is an Internet Protocol (IP) flow identified by a source IP address and/or a destination IP address, identified by the source IP address, the destination IP address and/or a layer 4 protocol (e.g., Internet Control Message Protocol (ICMP)), or identified by a 5 tuples, i.e., the source IP address, a source port number, the destination IP address, a destination port number, and the layer 4 protocol (e.g., Transmission Control Protocol (TCP) or User Datagram Protocol (UDP)).

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and a communication device for handling data transmissions after a detecting failure. The communication device configures a DRB and a mapping that a flow is mapped to the DRB according to a RRC message, and transmits a plurality of PDUs of the flow over the DRB after recovering the failure. Thus, the problem of the data transmissions after the failure can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling data transmissions after detecting a failure, comprising:
a storage device, for storing instructions of:
receiving a first radio resource control (RRC) message configuring a first data radio bearer (DRB) and configuring a mapping that a first flow is mapped to the first DRB, from a first BS;
transmitting a first plurality of protocol data units (PDUs) of the first flow over the first DRB to the first BS in response to the first RRC message, wherein the first RRC message comprises a mapping configuration configuring the mapping and a DRB configuration configuring the first DRB;
receiving a PDU of the first flow or a second flow over a second DRB from the first BS;
transmitting a second plurality of PDUs of the first flow over the second DRB to the first BS in response to the PDU;
detecting a failure, wherein the failure is a radio link failure, a handover failure, an integrity check failure or a RRC connection reconfiguration failure;
keeping the mapping configuration and the DRB configuration in response to the failure;
transmitting a failure recovery request message to the first BS or a second BS in response to the failure;
receiving a failure recovery message from the first BS or the second BS in response to the failure recovery request message; and
transmitting a third plurality of PDUs of the first flow over the first DRB to the first BS or the second BS in response to the failure recovery message, after recovering the failure; and
a processing circuit, coupled to the storage device, configured to execute the instructions stored in the storage device.

2. The communication device of claim 1, wherein the storage device further stores the instructions of:
releasing a secondary cell (SCell) configuration or a secondary cell group (SCG) configuration in response to the failure;
being configured with an identifier for monitoring a control channel transmitted by the first BS for scheduling at least one of an uplink (UL) transmission and a downlink (DL) transmission, before detecting the failure; and
keeping the identifier in response to the failure.

3. The communication device of claim 1, wherein the storage device further stores the instructions of:
transmitting the third plurality of PDUs of the first flow over the first DRB in response to the failure recovery message, when the failure recovery message does not configure a mapping that the first flow is mapped to the second DRB; and
transmitting the third plurality of PDUs of the first flow over the second DRB in response to the failure recovery message, when the failure recovery message configures the mapping that the first flow is mapped to the second DRB.

4. A communication device for handling data transmissions after detecting a failure, comprising:
a storage device, for storing instructions of:
receiving a first radio resource control (RRC) message configuring a first data radio bearer (DRB) and configuring a mapping that a first flow is mapped to the first DRB, from a first BS, wherein the first RRC message comprises a mapping configuration configuring the mapping and a DRB configuration configuring the first DRB;
transmitting a first plurality of protocol data units (PDUs) of the first flow over the first DRB to the first BS in response to the first RRC message;
receiving a PDU of the first flow or a second flow over a second DRB from the first BS;
transmitting a second plurality of PDUs of the first flow over the second DRB to the first BS in response to the PDU;
detecting a failure, wherein the failure is a radio link failure, a handover failure, an integrity check failure or a RRC connection reconfiguration failure;
transmitting a failure recovery request message to the first BS or a second BS in response to the failure;
receiving a failure recovery message from the first BS or the second BS in response to the failure recovery request message; and
transmitting a third plurality of PDUs of the first flow over the second DRB to the first BS or the second BS in response to the failure recovery message, after recovering the failure; and
a processing circuit, coupled to the storage device, configured to execute the instructions stored in the storage device.

5. The communication device of claim 4, wherein the storage device further stores the instructions of:
keeping the DRB configuration in response to the failure;
releasing the mapping configuration and keeping at least one configuration in the DRB configuration, if the mapping configuration is comprised in the DRB configuration; and
releasing the mapping configuration and keeping at least one configuration in a packet data convergence protocol (PDCP) configuration, if the mapping configuration is comprised in the PDCP configuration.

6. The communication device of claim 4, wherein the storage device further stores the instructions of:
receiving the PDU of the first flow or the second flow over the second DRB from the first BS, to indicate the communication device to transmit a fourth plurality of PDUs of the first flow over the second DRB, wherein the indication is valid after the failure is detected; and
transmitting a fifth plurality of PDUs of the first flow over the first DRB according to the indication to the second BS, after recovering the failure.

7. The communication device of claim 4, wherein the storage device further stores the instruction of:
  releasing at least one of a power control configuration and a periodic channel quality indicator (CQI) reporting configuration in response to the failure.

8. The communication device of claim 4, wherein the storage device further stores the instructions of:
  being configured with an identifier for monitoring a control channel transmitted by the first BS for scheduling at least one of an uplink (UL) transmission and a downlink (DL) transmission, before detecting the failure; and
  keeping the identifier in response to the failure.

9. The communication device of claim 4, wherein the storage device further stores the instructions of:
  transmitting the third plurality of PDUs of the first flow over the second DRB in response to the failure recovery message, when the failure recovery message does not comprise a mapping configuration indicating that the first flow is mapped to a DRB; and
  transmitting the third plurality of PDUs of the first flow over a third DRB in response to the failure recovery message, when the failure recovery message configures a mapping that the first flow is mapped to the third DRB.

10. The communication device of claim 4, wherein the storage device further stores the instructions of:
  resuming at least one signalling radio bearer (SRB) of a RRC connection, when receiving the failure recovery message, wherein the failure recovery message reconfigures the at least one SRB of the RRC connection; and
  resuming at least one of the first DRB and a third DRB, when receiving a second RRC message, wherein the second RRC message reconfigures the at least one of the first DRB and the third DRB.

11. A communication device for handling data transmissions after detecting a failure, comprising:
  a storage device, for storing instructions of:
    receiving a first radio resource control (RRC) message configuring a first data radio bearer (DRB) and configuring a mapping that a first flow is mapped to the first DRB, from a first BS, wherein the first RRC message comprises a mapping configuration configuring the mapping and a DRB configuration configuring the first DRB;
    transmitting a first plurality of protocol data units (PDUs) of the first flow over the first DRB to the first BS in response to the first RRC message;
    receiving a PDU of the first flow or a second flow over a second DRB from the first BS;
    transmitting a second plurality of PDUs of the first flow over the second DRB to the first BS in response to the PDU;
    detecting a failure, wherein the failure is a radio link failure, a handover failure, an integrity check failure or a RRC connection reconfiguration failure;
    transmitting a failure recovery request message to the first BS or a second BS in response to the failure;
    receiving a failure recovery message from the first BS or the second BS in response to the failure recovery request message;
    transmitting a failure recovery complete message to the first BS or the second BS in response to the failure recovery message;
    receiving a second RRC message from the first BS or the second BS, after transmitting the failure recovery complete message; and
    transmitting a third plurality of PDUs of the first flow over the second DRB to the first BS or the second BS in response to the second RRC message; and
  a processing circuit, coupled to the storage device, configured to execute the instructions stored in the storage device.

12. The communication device of claim 11, wherein the first RRC message or a third RRC message transmitted by the first BS configures the second DRB, before the failure occurs.

13. The communication device of claim 11, wherein the storage device further stores the instruction of:
  releasing a secondary cell (SCell) configuration or a secondary cell group (SCG) configuration in response to the failure.

14. The communication device of claim 11, wherein the storage device further stores the instructions of:
  being configured with an identifier for monitoring a control channel transmitted by the first BS for scheduling at least one of an uplink (UL) transmission and a downlink (DL) transmission, before detecting the failure; and
  keeping the identifier in response to the failure.

15. The communication device of claim 11, wherein the storage device further stores the instructions of:
  receiving the PDU of the first flow or the second flow over the second DRB from the first BS, to indicate the communication device to transmit a fourth plurality of PDUs of the first flow over the second DRB, wherein the indication is valid after the failure is recovered; and
  transmitting a fifth plurality of PDUs of the first flow over the first DRB according to the indication to the second BS in respond to the second RRC message.

16. The communication device of claim 11, wherein the storage device further stores the instruction of:
  transmitting the third plurality of PDUs of the first flow over a third DRB in response to the second RRC message, when the second RRC message configures a mapping that the first flow is mapped to the third DRB.

17. The communication device of claim 11, wherein the storage device further stores the instructions of:
  resuming at least one signalling radio bearer (SRB) of a RRC connection, when receiving the failure recovery message; and
  resuming at least one of the first DRB and the second DRB, when receiving the second RRC message, wherein the second RRC message reconfigures the at least one of the first DRB and the second DRB.

* * * * *